United States Patent
Boerner et al.

(10) Patent No.: US 6,476,395 B2
(45) Date of Patent: Nov. 5, 2002

(54) FLAT X-RAY DETECTOR COMPRISING AN ALKALI-HALOGENIDE SCINTILLATOR

(75) Inventors: Herbert Friedrich Boerner, Aachen (DE); Hans Nikol, Eindhoven (NL); Herfried Karl Wieczorek, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/741,923

(22) Filed: Dec. 20, 2000

(65) Prior Publication Data

US 2001/0006214 A1 Jul. 5, 2001

(30) Foreign Application Priority Data

Dec. 21, 1999 (DE) .......................... 199 61 673

(51) Int. Cl.$^7$ ................................. G01T 1/20
(52) U.S. Cl. .................... 250/368; 250/366; 250/483.1; 250/214 VT
(58) Field of Search ................ 250/368, 366, 250/483.1, 214 VT

(56) References Cited

U.S. PATENT DOCUMENTS

| | | | | |
|---|---|---|---|---|
| 4,076,984 A | * | 2/1978 | Gromov et al. | 250/368 |
| 4,375,423 A | * | 3/1983 | Cusano et al. | 250/483.1 |
| 5,623,141 A | * | 4/1997 | Hou et al. | 250/214 VT |
| 6,078,052 A | * | 6/2000 | DiFilippo | 250/368 |
| 6,178,224 B1 | * | 1/2001 | Polichar et al. | 250/368 |

FOREIGN PATENT DOCUMENTS

| | | | | |
|---|---|---|---|---|
| DE | 19519775 A | | 12/1996 | H01J/9/22 |

* cited by examiner

*Primary Examiner*—Constantine Hannaher
*Assistant Examiner*—Andrew Israel
(74) *Attorney, Agent, or Firm*—John Vodopia

(57) ABSTRACT

This disclosure defined by this invention sets forth an X-ray detector including a scintillator. The scintillator is formed with a doped alkali halogenide and is constructed with an array of photodiodes including at least one photodiode containing a semiconductor material with a color transformer. The color transformer contains a photoluminescent phosphor and may be arranged between the scintillator and the array of photodiodes. One benefit of the scintillator, and an x-ray detect which includes the scintillator, is that it enables a larger part of the X-radiation to be used for image analysis.

8 Claims, No Drawings

FLAT X-RAY DETECTOR COMPRISING AN ALKALI-HALOGENIDE SCINTILLATOR

The invention relates to an X-ray detector, in particular for X-ray photography and X-ray fluoro-chemical analysis, which X-ray detector comprises a scintillator containing a doped alkali halogenide and an array of photodiodes including at least one photodiode containing a semiconductor material.

In X-ray photography and X-ray fluoro-chemical analysis, X-radiation is analyzed which is emitted by an X-ray source and, on passing through the human body or a material, absorbed and attenuated in dependence upon the density of said human body or said material. X-radiation can be subjected to further processing in various ways. In an X-ray detector, the X-ray shadow image obtained is first absorbed by a scintillator and transposed in the scintillator into less energy-rich luminescent radiation in the visible range or the UV-range. This luminescent radiation is subsequently transmitted to an array of photodiodes. In the photodiodes, the luminescent radiation is converted to an electric signal, which can be subjected to further processing by means of readout electronics. The combination of a scintillator and an array of photodiodes thus enables a digital image to be obtained of the incident X-radiation.

Doped alkali halogenides can very suitably be used as the scintillators for X-ray detectors because they exhibit a high mass extinction coefficient for X-radiation. X-ray detectors comprising such scintillators are disclosed in DE 195 19 775.

The spectral distribution and the light output of the luminescent light generated in the scintillator depends on the doping selected for the alkali halogenides.

Also the array of photodiodes succeeding the scintillator do not act uniformly over the appropriate frequency range of the luminescent light. Certain frequency ranges of the luminescent light exhibit a high response threshold in the photodiodes, leading to a reduction of the sensitivity of the X-ray detector in this range. As a result, the wavelength of the luminescent light of the scintillator generally is outside the maximum of the photosensitivity of the photodiodes.

It is an object of the invention to provide an X-ray detector comprising a scintillator including a doped alkali halogenide, and comprising an array of photodiodes including at least one photodiode containing a semiconductor material, which X-ray detector exhibits a high efficiency.

In accordance with the invention, this object is achieved by an X-ray detector comprising a scintillator including a doped alkali halogenide, and comprising an array of photodiodes including at least one photodiode containing a semiconductor material, wherein a color transformer containing a photoluminescent phosphor is arranged between the scintillator and the array of photodiodes.

The photoluminescent phosphor contained in the color transformer enables a larger proportion of the X-radiation to be used for image analysis. The phosphor absorbs the luminescent radiation and converts it to luminescent radiation that is adapted to the spectral sensitivity of the photodiode, so that the emission spectrum of the scintillator and the sensitivity spectrum of the photodiode demonstrate a maximum overlap, and the photodiode operates with maximum quantum efficiency.

In accordance with a modification of the invention, the color transformer may contain two or more photoluminescent phosphors. This is useful in the event that the color-transformation effect of a single phosphor is insufficient. In this case, the combination of a plurality of phosphors enables a cascade effect to be attained, causing the luminescent radiation to be transferred to the desired wavelength range.

In accordance with a preferred embodiment of the invention, the scintillator comprises a doped alkali halogenide having an emission maximum at a wavelength $\lambda$ in the range from 400 to 440 nm.

The scintillator very preferably contains CsI:Na as the doped alkali halogenide. CsI:Na emits a high-energy luminescent spectrum in the wavelength range between 400 and 440 nm, which luminescent spectrum has a short relaxation time; the images produced are free of memory effects and losses due to radiation-free conversion processes.

In a further embodiment in accordance with the invention, the photodiode may contain amorphous silicon as the semiconductor material. In the case of photodiodes of amorphous silicon, particularly in combination with a scintillator of CsI:Na or CsI:$CO_3^{2-}$, it proved to be very advantageous to use a green phosphor for the photoluminescent phosphor.

For the green phosphor use can very suitably be made of a perylene derivative, $SrGa_2S_4$:Eu, ZnS:Cu,Au, $BaMgAl_{10}O_{17}$:Eu,Mn or YAG:Ce.

In a very preferred embodiment, the array of photodiodes is a large-surface matrix-addressed image sensor on a TFT matrix.

These and other aspects of the invention will be apparent from and elucidated with reference to the embodiment(s) described hereinafter.

The X-ray detector comprises a scintillator, an array of photodiodes and a phosphor-containing color transformer arranged therebetween. Customarily, the scintillator, the array of photodiodes and the color transformer are each in the form of a layer, which layers are combined so as to form a layer system.

A scintillator layer forms the input screen for the X-radiation. The color-transforming layer is arranged below the scintillator layer, and the photodiode layer is arranged below said color-transforming layer. Electrical contact leads extend from the photodiode layer to the readout electronics.

An important element of the scintillator is a layer of an alkaline halogenide doped with a foreign ion. The foreign ions, such as Tl(I), Ga(I), In(I) or a second alkali ion are incorporated in the crystal lattice of the alkali halogenide, as a result of which they generate luminescence centers. The scintillator must exhibit a high absorbing capacity for X-radiation, i.e. the scintillator should contain elements of a high atomic number. Scintillator layers having a column structure can be generated by means of vapor deposition methods, which scintillator layers enable a good local resolution to be obtained by focusing the light into the elongated scintillator crystals. Scintillator crystals having a regular crystal shape should be small in order to enable a satisfactory local resolution. In addition, the relaxation time should be short, so that also motion processes can be captured. A selection of doped alkali halogenides which meet these requirements is listed in Table 1.

| Host crystal | Activator | Emission maximum[nm] |
|---|---|---|
| LiI | Eu | 440 |
| NaI | Tl | 410 |
| CsI | Tl | 565–600 |
| CsI | Na | 430 |
| LiF | Mg | 400 |

-continued

| Host crystal | Activator | Emission maximum[nm] |
|---|---|---|
| LiF | Mg, Ti | 400 |
| LiF | Mg, Na | 400 |

The scintillator layers of doped alkali halogenide are customarily manufactured by vapor depositing the connections on a substrate. As a result, the scintillator layers may additionally include a substrate. For the substrate use can be made of the detector, for example a detector with photodiodes of amorphous silicon on a glass plate. Also glass plates themselves, aluminum sheet and discs of aluminum oxide can suitably be used as substrates for the scintillator. These scintillators are bonded to the detector.

In the photodiodes, the light signals are converted to electric signals. The electron hole pairs generated by the radiation absorption are separated in the field of the pn junction and supply a current via the outer electrodes. The limitation of the spectral sensitivity range is defined by the band gap of the semiconductor material, i.e. in general silicon. The spectral sensitivity distribution of a silicon photodiode can be influenced to a limited extent by the manufacturing technology.

Preferably, use is made of arrays of photodiodes which are combined with TFT transistors to form large-surface image sensors. The semiconductor material used for these large-surface diode arrays is hydrogen-saturated amorphous silicon (a-Si:H) or polycrystalline silicon (p-Si). Their spectral-sensitivity maximum lies in the range between 550 and 600 nm.

The color-transformation layer is inserted between the scintillator layer and the layer comprising the array of photodiodes. The color-transformation layer contains a photoluminescent phosphor. The color-transformation phosphor transposes the luminescent light from the scintillator into a wavelength range which corresponds to the spectral-sensitivity maximum of the photodiode.

In accordance with the basic principle of photoluminescence, light of an energetically higher color can be converted to light of an energetically lower color. From light of the blue wavelength range all other colors can be obtained, because the energy level of the blue color is the highest of all spectral colors. If a photoluminescent phosphor emitting green light is illuminated with the blue light from a scintillator, then the green dye is excited by the blue light, causing it to subsequently emit green light.

If the color-transmission layer is provided directly onto the scintillator without an intermediate air layer, then a quantum conversion efficacy up to 90% may be attained, which can be attributed to the fact that reflection losses between the layers are minimized.

Green dyes generally exhibit a very good blue-light absorption.

Red dyes, which can suitably be used as color-transformation agents for photodiodes whose spectral-sensitivity maximum lies in the red to infrared range, generally exhibit only a small absorption in the blue range and hence cannot be efficiently excited by means of blue light. They can however suitably be used as color-transformation agents for green-emitting scintillators. Alternatively, a red dye can be coupled with a green dye, resulting in a cascade conversion from blue via green to red.

Organic and inorganic phosphors having a high photoluminescent quantum yield are used as the phosphors for the color-transformation layer. For the green phosphors use can suitably be made of perylene derivatives, such as Vat Green 1, C.I. 59825 or the inorganic phosphors $SrGa_2S_4$:Eu having an emission maximum at 535 nm, ZnS:Cu,Au having an emission maximum at 540 nm, $BaMgAl_{10}O_{17}$:Eu,Mn having an emission maximum at 520 nm or YAG:Ce having an emission maximum at 550 nm.

To manufacture homogeneous color-transformation layers, the phosphors are preferably embedded in a matrix of a polymeric synthetic resin. For example, the phosphor can be embedded in the polyimide layer, which is customarily used to protect the photodiodes from environmental influences. It is alternatively possible, however, to provide the phosphors in a separate layer on the photodiode or on the scintillator, and, for this reason, embed the phosphors in a matrix of a synthetic resin such as polymethylmethacrylate, polystyrole, and the like. These layers can particularly suitably be manufactured by means of spin-coating processes.

A combination which proved to be advantageous comprises a scintillator, which contains CsI:Na as the doped alkali halogenide, and a green perylene pigment as the color-transformation agent as well as a large-surface matrix-addressed image sensor of amorphous silicon on a glass substrate. CsI:Na emits a high-energy light which is readily absorbed by the green phosphor and transformed to a wavelength range of approximately 520 nm. The photodiode of amorphous silicon has the maximum spectral sensitivity in this range. Since it is precluded by the color-transformation agent that light of the red or infrared range must be processed by the photodiode, the layer thickness for the silicon may be comparatively small, resulting in a saving of production costs. Simultaneously, trapping of charge carriers in the amorphous silicon layer leading to phantom images as a result of transient photocurrents, is precluded.

What is claimed is:

1. An X-ray detector comprising a scintillator including a doped alkali halogenide comprising an array of photodiodes including at least one photodiode containing a semiconductor material, wherein a color transformer containing a photoluminescent phosphor is arranged in a layer and disposed between the scintillator and the array of photodiodes without an intermediate air layer.

2. An X-ray detector as claimed in claim 1, wherein the color transformer contains at least two photoluminescent phosphors.

3. An X-ray detector as claimed in claim 1, wherein the scintillator comprises a doped alkali halogenide having an emission maximum at a wavelength $\lambda$ in the range from about 400 to about 440 nm.

4. An X-ray detector as claimed in claim 1, wherein the scintillator contains CsI:Na or CsI:$CO_3^{2-}$.

5. An X-ray detector as claimed in claim 1, wherein the photodiode contains amorphous silicon as the semiconductor material.

6. An X-ray detector as claimed in claim 5, wherein the photoluminescent phosphor is a green phosphor.

7. An X-ray detector as claimed in claim 6, characterized in that the green phosphor is a perylene derivative, $SrGa_2S_4$:Eu, ZnS:Cu,Au, $BaNgAl_{10}O_{17}$:Eu,Mn or YAG:Ce.

8. An X-ray detector as claimed in claim 1, characterized in that the array of photodiodes is a large-surface matrix-addressed image sensor on a TFT matrix.

* * * * *